(12) United States Patent
Nishikawa et al.

(10) Patent No.: US 8,105,565 B2
(45) Date of Patent: Jan. 31, 2012

(54) PROCESS FOR PRODUCING GRAPHITE FILM

(75) Inventors: Yasushi Nishikawa, Osaka (JP); Shuhei Wakahara, Osaka (JP); Mutsuaki Murakami, Osaka (JP)

(73) Assignee: Kaneka Corporation, Osaka-Shi, Osaka (JP)

( * ) Notice: Subject to any disclaimer, the term of this patent is extended or adjusted under 35 U.S.C. 154(b) by 193 days.

(21) Appl. No.: 11/791,003

(22) PCT Filed: Nov. 15, 2005

(86) PCT No.: PCT/JP2005/020969
§ 371 (c)(1),
(2), (4) Date: May 17, 2007

(87) PCT Pub. No.: WO2006/057183
PCT Pub. Date: Jun. 1, 2006

(65) Prior Publication Data
US 2008/0014426 A1 Jan. 17, 2008

(30) Foreign Application Priority Data

Nov. 24, 2004 (JP) ................................. 2004-339405

(51) Int. Cl.
*C01B 31/04* (2006.01)

(52) U.S. Cl. .................... 423/448; 423/445 R; 428/220; 428/408

(58) Field of Classification Search .................. 428/220, 428/408; 423/448, 445, 449.6, 450, 453, 423/445 R
See application file for complete search history.

(56) References Cited

U.S. PATENT DOCUMENTS
4,876,077 A * 10/1989 Murakami .................... 423/448
(Continued)

FOREIGN PATENT DOCUMENTS
EP 1167293 A 6/2002
(Continued)

OTHER PUBLICATIONS

Inagaki, M. et al. "Carbonization and graphitization of polyimide Upilex". J. Mater. Res., vol. 6, No. 5, May 1991.*
(Continued)

*Primary Examiner* — Stuart Hendrickson
*Assistant Examiner* — Richard M Rump
(74) *Attorney, Agent, or Firm* — Birch, Stewart, Kolasch & Birch, LLP

(57) ABSTRACT

A graphite film having excellent thermal conductivity, surface hardness, surface adhesion and appearance can be obtained. Further, a thick graphite film in which each of such properties is excellent can be obtained. There is provided a process for producing a graphite film in which a polymer film is thermally treated at a temperature of 2,000° C. or more, the process comprising the step of bringing a polymer film into contact with a substance containing a metal during graphitization treatment. When a polymer film having a high plane orientation is used as a raw material and the raw material is brought into contact with a metal to thermally treat the material, a problem of separation of graphite from the surface can be solved which has not been solved by the prior art, and furthermore a graphite can be obtained having excellent thermal conductivity, surface hardness, density and surface adhesion. An effect that cannot be expected in the prior art can be achieved by bringing a polymer film having a high plane orientation into contact with a metal to thermally treat the film.

33 Claims, 5 Drawing Sheets

U.S. PATENT DOCUMENTS

| | | | |
|---|---|---|---|
| 4,915,984 A * | 4/1990 | Murakami | 427/113 |
| 5,070,181 A * | 12/1991 | Kawai et al. | 528/353 |
| 5,443,859 A * | 8/1995 | Nagata | 427/122 |
| 5,976,697 A * | 11/1999 | Brehler et al. | 428/408 |
| 6,022,518 A * | 2/2000 | Yamazaki et al. | 423/448 |
| 2001/0053743 A1 * | 12/2001 | Ryu et al. | 502/182 |
| 2002/0021997 A1 | 2/2002 | Taomoto et al. | |

FOREIGN PATENT DOCUMENTS

| | | |
|---|---|---|
| JP | 61-275115 A | 12/1986 |
| JP | 2001-220115 A | 8/2001 |
| JP | 2002-12485 A | 1/2002 |
| JP | 2004-17504 A | 1/2004 |
| JP | 2004-269319 * | 3/2004 |
| JP | 2004-123506 A | 4/2004 |
| JP | 2004-269319 A | 9/2004 |

OTHER PUBLICATIONS

Suhng, Y. "The study of graphitization of behavior for polyimide and polyamide acid films" Synthetic Materials 71 (1995) 1751-1752.*

* cited by examiner

1

2

PROCESS FOR PRODUCING GRAPHITE FILM

RELATED APPLICATION

This application is a nationalization of PCT application PCT/JP2005/020969 filed on Nov. 15, 2005 claiming priority to Japanese Application No. 2004-339405 filed on Nov. 24, 2004, the contents of which are incorporated herein by reference in their entirety.

TECHNICAL FIELD

The present invention relates to a process for producing a graphite film used as a heat radiation film.

BACKGROUND ART

A process for producing graphite comprising heating at least one polymer film selected from polybenzothiazole, polybenzobisthiazole, polybenzoxazole and polybenzobisoxazole at 1,800° C. or more to convert the film into a graphite (Patent Document 1) has been known as a process for producing a graphite film having excellent thermal conductivity.

The graphite obtained by the process of Patent Document 1 has extremely high thermal conductivity, and is therefore used as a heat radiation member in electronics. The graphite is specifically used in 1) a heat radiation spacer held between a CPU and a cooling fan or heat sink or 2) a heat radiation spreader attached to a DVD optical pickup or enclosure to diffuse heat, for example.

A graphite must be actually attached to a heat generating component using an adhesive or pressure sensitive adhesive. Graphite is easily separated from the surface of the graphite obtained by the method of Patent Document 1 and the graphite obtained by the method is in a foaming state. Accordingly the graphite has an inferior adhesive force, and cannot be attached to a heat generating component or cannot exhibit sufficient heat radiation capability.

The graphite obtained by the method of Patent Document 1 has a low surface hardness. When the graphite is attached to electronics or handled, the surface of the graphite is damaged and graphite is separated from the damaged area. Thus, the inside of the electronics is contaminated, or the graphite cannot exhibit sufficient heat radiation capability.

In particular, as the thickness of the raw material film is larger, graphite is easily separated from the surface of the graphite and the graphite is in a foaming state. Accordingly, hardness of the film is reduced. Further, the film has a decreased thermal diffusivity, has a lower strength and is easily broken. On the other hand, a graphite film must be thick in order to have improved heat radiation properties. Improvement of thermal conductivity cannot be achieved at the same time with use of a thick polymer film as a raw material.

Patent Document 1: Japanese Patent Laid-open No. 61-275115

DISCLOSURE OF THE INVENTION

Problems to be Solved by the Invention

In view of the aforementioned problems in the prior art, an object of the present invention is to provide a graphite film having:
1) sufficient thermal conductivity in which heat from a heat generating component can be rapidly transferred;
2) surface hardness sufficient so that the surface of the graphite is not damaged when attached or handled;
3) sufficient surface adhesion so that the graphite is not separated and can exhibit heat radiation properties inherent to the graphite when attached to a heat generating component using an adhesive or pressure sensitive adhesive;
4) appearance sufficient so that the inside of electronics is not contaminated by graphite separated from the surface of the film; and
5) a thickness sufficient so that the film can exhibit improved heat radiation properties.

Means for Solving the Problems (1) A first aspect of the present invention is:
a process for producing a graphite film in which a polymer film is thermally treated at a temperature of 2,000° C. or more, the process comprising the step of bringing a polymer film into contact with a substance containing a metal during thermal treatment.

(2) A second aspect of the present invention is:
a process for producing a graphite film in which a polymer film is thermally treated at a temperature of 2,000° C. or more, the process comprising at least the step of bringing a carbonized polymer film into contact with a substance containing a metal during thermal treatment.

(3) A third aspect of the present invention is:
a process for producing a graphite film in which a polymer film is brought into contact with a container and thermally treated at a temperature of 2,000° C. or more, wherein the container contains a metal.

(4) A fourth aspect of the present invention is:
the process for producing a graphite film according to (3), wherein the container can be closed.

The phrase "the container can be closed" means that the container can be surrounded on four or six sides so that the polymer film and/or the carbonized polymer film can be sufficiently brought into contact with a substance containing a metal. Atmospheric gas around the polymer film and/or the carbonized polymer film may be expanded as the temperature is increased. It is preferable to ensure a place where the atmospheric gas can escape. Accordingly, the phrase "the container can be closed" in the present invention does not mean that the container is in a completely closed state in which the container is broken by the pressure of expanded atmospheric gas.

(5) A fifth aspect of the present invention is:
the process for producing a graphite film according to any of (1) to (4), wherein the metal is one or more selected from the group consisting of elements of Groups 4, 5, 6, 7, 8, 9, 10, 11, 12 and 13 such as aluminum and boron according to the IUPAC (International Union of Pure and Applied Chemistry) Nomenclature of Inorganic Chemistry, revised edition (1989), lithium, beryllium, sodium, magnesium, potassium, calcium, barium, silicon, germanium, selenium, tin, lead and bismuth.

(6) A sixth aspect of the present invention is:
the process for producing a graphite film according to any of (1) to (4), wherein the metal is one or more selected from the group consisting of titanium, vanadium, chromium, manganese, iron, cobalt, nickel, copper, zinc, zirconium, niobium, molybdenum, technetium, ruthenium, rhodium, palladium, silver, cadmium, hafnium, tantalum, tungsten, rhenium, osmium, iridium, platinum, gold and mercury.

(7) A seventh aspect of the present invention is:
the process for producing a graphite film according to any of (1) to (6), wherein the polymer film is composed of one or more polymers selected from the group consisting of polyimide, polyamide, polyoxadiazole, polybenzoxazole, polybenzobisoxazole, polythiazole, polybenzothiazole, polybenzobisthiazole, poly(p-phenylene vinylene), polybenzimidazole and polybenzobisimidazole.

(8) An eighth aspect of the present invention is:
the process for producing a graphite film according to (7), wherein the polymer film is a polyimide film having a birefringence of 0.08 or more.

(9) A ninth aspect of the present invention is:
the process for producing a graphite film according to (7), wherein the polymer film is a polyimide film having a birefringence of 0.12 or more.

(10) A tenth aspect of the present invention is:
the process for producing a graphite film according to any of (7) to (9), wherein the polyimide film can be prepared by imidizing a polyamide acid as a precursor using a dehydrating agent and an imidization promoter.

(11) An eleventh aspect of the present invention is:
the process for producing a graphite film according to any of (7) to (9), wherein the polyimide film can be prepared by imidizing a polyamide acid containing pyromellitic acid dianhydride and p-phenylenediamine using a dehydrating agent and an imidization promoter.

(12) A twelfth aspect of the present invention is:
the process for producing a graphite film according to any of (7) to (9), wherein the polyimide film can be prepared by synthesizing a prepolymer having an acid dianhydride at each terminal from a diamine and the acid dianhydride; synthesizing a polyamide acid by reaction of the prepolymer with a diamine differing from the diamine; and imidizing the polyamide acid.

(13) A thirteenth aspect of the present invention is:
the process for producing a graphite film according to any of (7) to (12), wherein the polymer film contains the metal.

(14) A fourteenth aspect of the present invention is:
a graphite film having a thermal diffusivity of $7\times10^{-4}$ m$^2$/s or more and a pencil hardness of 2B or more.

(15) A fifteenth aspect of the present invention is:
a graphite film having a thermal diffusivity of $7\times10^{-4}$ m$^2$/s or more and a pencil hardness of 2B or more, which can be produced by the process according to any of (1) to (13).

(16) A sixteenth aspect of the present invention is:
the graphite film according to any of (14) and (15), which has a thickness of 90 μm or more.

Advantages of the Invention

In the prior art, it is difficult to produce a graphite film having excellent thermal conductivity, surface hardness, surface adhesion and appearance. In particular, it is very difficult to obtain a thick graphite film having these properties together.

On the other hand, the process for producing a graphite film in which a polymer film is thermally treated at a temperature of 2,000° C. or more, the process comprising bringing a polymer film into contact with a substance containing a metal in a graphitization process can produce a graphite film having:

1) sufficient thermal conductivity in which heat from a heat generating component can be rapidly transferred;
2) surface hardness sufficient so that the surface of the graphite is not damaged when attached or handled;
3) sufficient surface adhesion so that the graphite is not separated and can exhibit heat radiation properties inherent to the graphite when attached to a heat generating component using an adhesive or pressure sensitive adhesive;
4) appearance sufficient so that the inside of electronics is not contaminated by graphite separated from the surface of the film; and
5) a thickness sufficient so that the film can exhibit improved heat radiation properties.

The graphite film is specifically described as follows.

1) With regard to thermal conductivity, the graphite film has a thermal diffusivity of $7\times10^{-4}$ m$^2$/s or more, preferably $8\times10^{-4}$ m$^2$/s, and more preferably $8.5\times10^{-4}$ m$^2$/s. When the graphite film has a thermal diffusivity of $7\times10^{-4}$ m$^2$/s or more, heat from a heat generating component can be sufficiently diffused.

2) With regard to surface hardness, the graphite film specifically has a pencil hardness measured based on JIS K 5400 of 2B or more, preferably B or more, and more preferably HB or more. The graphite having a pencil hardness of 2B or more has surface hardness sufficient so that the surface of the graphite is not damaged when attached or handled.

3) With regard to surface adhesion, the graphite film has an adhesive force measured based on the "Testing methods of pressure sensitive adhesive tapes and sheets" of JIS Z 0237 of 3 N/cm or more, preferably 4 N/cm or more, and more preferably 5 N/cm or more. When the graphite having an adhesive force of 3 N/cm or more is attached to a heat generating component using an adhesive or pressure sensitive adhesive, the graphite is not separated and can exhibit heat radiation properties inherent to the graphite.

4) With regard to surface appearance, the graphite film has a rating measured by the "X-cut tape method" of JIS K5400 of 6 or more, and preferably 8 or more. When the appearance rating is 6 or more, the graphite attached to a heat generating component using an adhesive or pressure sensitive adhesive is not separated. Further, graphite is not separated from the surface of the graphite by air from a fan after bringing the graphite into contact with the heat generating component or installing the graphite in an apparatus and does not contaminate the inside of electronics.

5) The graphite film has a thickness of 50 μm or more, preferably 70 μm or more, and preferably 90 μm or more. The raw material polymer film used has a thickness of 70 μm or more, preferably 120 μm or more, and more preferably 150 μm or more. When the graphite film has a thickness of 50 μm or more and the raw material film has a thickness of 70 μm or more, the graphite film can transport a larger amount of heat and can exhibit heat radiation properties superior to those of a conventional graphite film.

When a polymer film having a high plane orientation is used as a raw material and the raw material is brought into contact with a metal to thermally treat the material, a problem of separation of graphite from the surface can be solved which has not been solved by the prior art, and furthermore a graphite can be obtained having excellent thermal conductivity, surface hardness, density and surface adhesion. An effect that cannot be expected in the prior art can be achieved by bringing a polymer film having a high plane orientation into contact with a metal to thermally treat the film.

DESCRIPTION OF SYMBOLS

Figure 1:
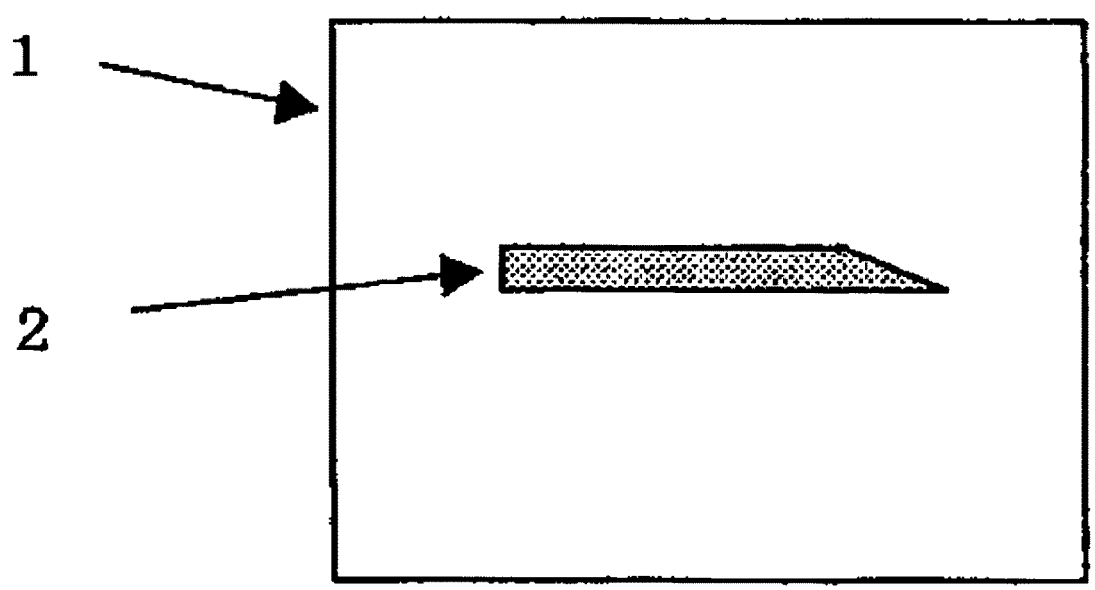
FIG. 1 is a view of a polyimide film and a wedge-shaped sheet.

1 Polyimide film
2 Wedge-shaped sheet
3 Width of wedge-shaped sheet
4 Sodium light
5 Interference

BEST MODE FOR CARRYING OUT THE INVENTION

The process for producing a graphite film of the present invention is a process for producing a graphite film in which a polymer film is thermally treated at a temperature of 2,000° C. or more, the process comprising the step of bringing a polymer film into contact with a substance containing a metal in a graphitization process.

<Graphite Film>

The graphite film prepared by the production process of the present invention has high thermal conductivity and electrical conductivity, and is therefore suitable as a heat radiation material, a heat radiation component, a cooling component, a temperature control component or an electromagnetic shielding component for electronics such as servers, personal computer servers and desktop personal computers; portable electronics such as notebook personal computers, electronic dictionaries, PDAs, mobile telephones and personal music players; displays such as liquid crystal displays, plasma displays, LEDs, organic EL displays, inorganic EL displays, liquid crystal projectors and watches; image-forming devices such as ink jet printers (ink head) and electrophotographic devices (developing devices, fixing devices, heat rollers and heat belts); semiconductor-related components such as semiconductor elements, semiconductor packages, semiconductor sealing cases, semiconductor die bonding, CPUs, memories, power transistors and power transistor cases; wiring boards (including printed wiring boards) such as rigid wiring boards, flexible wiring boards, ceramic wiring boards, build-up wiring boards and multilayer substrates; production equipment such as vacuum treatment equipment, semiconductor production equipment and display production equipment; heat-insulating devices such as heat-insulating materials, vacuum heat-insulating materials and radiation heat-insulating materials; data recording devices such as DVDs (optical pickups, laser generators and laser receivers) and hard disk drives; image-recording devices such as cameras, video cameras, digital cameras, digital video cameras, microscopes and CCDs; and battery devices such as charging devices, lithium ion batteries and fuel cells, for example.

<Polymer Film>

The polymer film that can be used in the present invention is not specifically limited, but is preferably a heat-resistant aromatic polymer film including at least one of polyimide (PI), polyamide (PA), polyoxadiazole (POD), polybenzoxazole (PBO), polybenzobisoxazole (PBBO), polythiazole (PT), polybenzothiazole (PBT), polybenzobisthiazole (PBBT), poly(p-phenylene vinylene) (PPV), polybenzimidazole (PBI) and polybenzobisimidazole (PBBI), because the finally obtained graphite film has high thermal conductivity. The film may be produced by a known production process. Among these, polyimide is preferable, because polymer films having various structures and properties can be obtained by selecting a raw material monomer from various monomers. Further, since a polyimide film is more easily carbonized and graphitized than a polymer film having another organic material as a raw material, the graphite tends to have excellent crystallinity and thermal conductivity.

With regard to in-plane orientation of molecules, the polymer film of the present invention has a birefringence Δn in any direction in the plane of the film of 0.08 or more, preferably 0.10 or more, more preferably 0.12 or more, and most preferably 0.14. When the polymer film has a birefringence of 0.08 or more, the graphite film has high thermal conductivity. Further, the graphite film has sufficiently high thermal conductivity even when the polymer film is graphitized at a low temperature, and the graphite film has high thermal conductivity even when the polymer film is thick. When the polymer film is brought into contact with a metal to thermally treat the film, the film has improved surface hardness, density and surface adhesion which are not improved by the prior art.

<Polymer Film and Birefringence>

The film is more easily carbonized and graphitized as the film has a higher birefringence. As a result, the graphite has improved crystalline orientation and significantly improved thermal conductivity. In particular, when the polymer film has high plane orientation, a graphite having excellent surface hardness, density and surface adhesion can be obtained, in which separation of graphite from the surface can be suppressed while maintaining high thermal conductivity, by bringing the polymer film into contact with a metal. Since the polymer film is easily carbonized, the graphite has excellent quality even if the heating rate is increased and the thermal treatment time is reduced during carbonization. Since the polymer film is easily graphitized, the graphite has excellent quality even if the highest temperature is reduced and the thermal treatment time is reduced during graphitization.

Since the film is carbonized and graphitized at a low temperature, the film has high thermal conductivity even in the middle of low-temperature thermal treatment. Heat is sufficiently transferred to the surface and inside of the film, and the film is uniformly graphitized easily.

Even if the raw material is thick, a graphite having excellent thermal conductivity can be obtained, since the surface and the inside of the material are uniformly graphitized.

It is not clear why the polymer film is easily graphitized as the film has a high birefringence. Molecules need to be rearranged for graphitization, and molecular rearrangement can be minimized in a polyimide film that has a high birefringence and excellent molecular orientation. Therefore, it is assumed that when a polyimide film having more excellent orientation is treated at a relatively low highest treatment temperature, a graphite film can be produced with higher crystallinity even if the graphite film is thick.

<Birefringence>

The birefringence herein refers to a difference between a refractive index in any in-plane direction of a film and a refractive index in the thickness direction of the film. The birefringence Δnx in any in-plane direction of a film is provided by the following formula 1.

Birefringence Δ$nx$=(Refractive index in the in-plane $X$ direction $Nx$)×(Refractive index in the thickness direction $Nz$)  (1)

Figure 2:
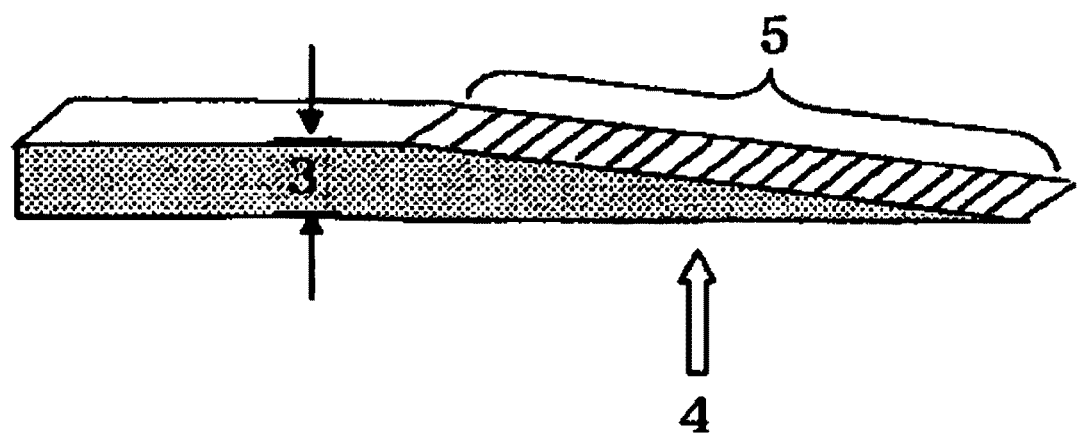
FIG. 2 is an oblique perspective view of a wedge-shaped sheet.

A specific method of measuring the birefringence is illustrated in FIGS. 1 and 2. In a plan view of FIG. 1, a thin wedge-shaped sheet 2 is cut off from a film 1 as a measurement sample. The wedge-shaped sheet 2 has a shape of an elongated trapezoid with one hypotenuse, and one basic angle of the sheet is a right angle. Here, the base of the trapezoid is cut off parallel to the X direction. FIG. 2 is an oblique view of the measurement sample 2 cut off in this manner. When the cut-off cross-section corresponding to the base of the trapezoid sample 2 is irradiated with sodium light 4 at a right angle and the sample is observed using a polarization microscope from the cut-off cross-section corresponding to the hypotenuse of the trapezoid sample 2, interference fringes 5 are observed. The birefringence Δnx in the in-plane X direction of the film, in which n is the number of interference fringes, is represented by the following formula 2:

$$\Delta nx = n \times \lambda / d \qquad (2)$$

wherein λ is a wavelength of a sodium D line of 589 nm, and d is a width 3 of the sample 2 corresponding to the height of the trapezoid of the sample. Details are described in "New Courses in Experimental Chemistry", vol. 19 (Maruzen, Co., Ltd.), for example.

The aforementioned term "any in-plane direction X of the film" refers to any of the 0° direction, 45° direction, 90° direction and 135° direction in the plane with reference to the direction of material flow when the film is formed, for example. Places and times for measurement of a sample are preferably as follows. When a sample is cut off from a roll-shaped raw material film (width: 514 mm), six places are sampled at intervals of 10 cm each in the width direction, and the birefringence is measured for each place. An average of the birefringences is determined as a birefringence.

<Thermal Properties, Mechanical Properties, Physical Properties and Chemical Properties of Polyimide Film>

The polyimide film as a raw material for the graphite used in the present invention has preferably an average coefficient of linear expansion of less than $2.5 \times 10^{-5}$/° C. at 100 to 200° C. When the coefficient of linear expansion is less than $2.5 \times 10^{-5}$/° C., the polyimide film is stretched only to a small extent and smoothly graphitized during thermal treatment, and a graphite not fragile with various excellent properties can be obtained. Conversion of such a polyimide film used as a raw material into the graphite starts at 2,400° C., and the polyimide film can be converted into a graphite having sufficient high crystallinity at 2,700° C. The coefficient of linear expansion is more preferably $2.0 \times 10^{-5}$/° C. or less.

The coefficient of linear expansion of the polymer film is determined using a TMA (thermomechanical analyzer) by first heating a sample to 350° C. at a heating rate of 10° C./min, then once cooling the sample with air to room temperature, again heating the sample to 350° C. at a heating rate of 10° C./min, and measuring the average coefficient of linear expansion at 100 to 200° C. at the second heating. Specifically, the coefficient of linear expansion is measured using a thermomechanical analyzer (TMA: SSC/5200H; TMA120C, manufactured by Seiko Instruments Inc.) in a nitrogen atmosphere by placing a film sample having a width of 3 mm and a length of 20 mm in a predetermined jig and applying a load of 3 g to the sample in a tensile mode.

The polyimide film used in the present invention preferably has a modulus of elasticity of 3.4 GPa or more, because such a film is more easily graphitized. Specifically, when the modulus of elasticity is 3.4 GPa or more, the film can be prevented from being broken by shrinkage of the film during thermal treatment, and a graphite having various excellent properties can be obtained.

The modulus of elasticity of the film can be measured in accordance with ASTM-D-882. The polyimide film has a modulus of elasticity of more preferably 3.9 GPa, and still more preferably 4.9 GPa or more. When the film has a modulus of elasticity smaller than 3.4 GPa, the film is easily broken and deformed by shrinkage of the film during thermal treatment, and the resulting graphite tends to have inferior crystallinity and thermal conductivity.

The water absorption of the film is measured as follows. The film is absolutely dried at 100° C. for 30 minutes to prepare a 25 μm-thick and 10 cm-square sample. The weight of the sample is measured as A1. The 25 μm-thick and 10 cm-square sample is dipped in distilled water at 23° C. for 24 hours, moisture on the surface is wiped and removed, and immediately the weight of the sample is measured. The weight of the sample is A2.

The water absorption is determined by the following formula.

$$\text{Water absorption (\%)} = (A2 - A1)/A1 \times 100$$

<Method for Preparing Polyimide Film>

The polyimide film used in the present invention can be produced by mixing an organic solution of polyamide acid as a polyimide precursor with an imidization promoter, then casting the mixture on a support such as an endless belt or stainless drum, and drying and firing the mixture into an imide.

The polyamide acid used in the present invention can be produced by a known method. Typically, substantially equimolar amounts of at least one aromatic acid dianhydride and at least one diamine are dissolved in an organic solvent. The resulting organic solution is stirred under controlled temperature conditions until polymerization of the acid dianhydride and the diamine is completed, so that the polyamide acid can be produced. Such a polyamide acid solution is obtained typically at a concentration of 5 to 35 wt %, and preferably at a concentration of 10 to 30 wt %. An appropriate molecular weight and an appropriate solution viscosity can be achieved when the solution concentration is within this range.

Any known method can be used as a polymerization method. For example, the following polymerization methods (1) to (5) are preferable.

(1) A method of dissolving an aromatic diamine in an organic polar solvent and reacting the diamine with an aromatic tetracarboxylic acid dianhydride in a molar amount substantially equal to that of the diamine to polymerize these components.

(2) A method of reacting an aromatic tetracarboxylic acid dianhydride with an aromatic diamine compound in a molar amount smaller than that of the dianhydride to obtain a prepolymer having an acid anhydride group at each terminal; and subsequently polymerizing the prepolymer using an aromatic diamine compound in a molar amount substantially equal to that of the aromatic tetracarboxylic acid dianhydride.

This method is the same as the method according to claim 13 of synthesizing a prepolymer having an acid dianhydride at each terminal from a diamine and the acid dianhydride and synthesizing a polyamide acid by reaction of the prepolymer with a diamine differing from the diamine.

(3) A method of reacting an aromatic tetracarboxylic acid dianhydride with an aromatic diamine compound in a molar amount larger than that of the dianhydride to obtain a prepolymer having an amino group at each terminal; subsequently further adding an aromatic diamine compound to the prepolymer; and then polymerizing the components using an aromatic tetracarboxylic acid dianhydride in a molar amount substantially equal to the aromatic diamine compound.

(4) A method of dissolving and/or dispersing an aromatic tetracarboxylic acid dianhydride in an organic polar solvent; and then polymerizing the solution and/or dispersion using an aromatic diamine compound in a molar amount substantially equal to that of the acid dianhydride.

(5) A method of reacting a mixture of substantially equimolar amounts of an aromatic tetracarboxylic acid dianhydride and an aromatic diamine in an organic polar solvent to polymerize the mixture.

Among these, a method shown in (2) or (3) is preferable, in which polymerization is carried out by sequential control (sequence control) via a prepolymer (control of a combination of block polymers and a connection of block polymer molecules). This is because a polyimide film having a large birefringence and a small coefficient of linear expansion is easily obtained by using this method, and a graphite having high crystallinity and excellent density and thermal conductivity is easily obtained by thermally treating the polyimide film. It is assumed that the polyimide film is regularly controlled to have many overlapping aromatic rings and is easily graphitized even by thermal treatment at a low temperature. When the imide group content is made higher to increase the birefringence, the carbon ratio in the resin is reduced and the carbonization yield after graphite treatment is decreased. The polyimide film synthesized by sequential control is preferable, because the birefringence can be increased without reducing the carbon ratio in the resin. Since the carbon ratio is increased, generation of decomposition gas can be suppressed, and a graphite film having excellent appearance is easily produced. Further, rearrangement of aromatic rings can be suppressed, and a graphite film having excellent thermal conductivity can be obtained.

Acid dianhydrides that can be used for synthesis of polyimide in the present invention include pyromellitic acid dianhydride, 2,3,6,7-naphthalenetetracarboxylic acid dianhydride, 3,3',4,4'-biphenyltetracarboxylic acid dianhydride, 1,2,5,6-naphthalenetetracarboxylic acid dianhydride, 2,2',3,3'-biphenyltetracarboxylic acid dianhydride, 3,3',4,4'-benzophenonetetracarboxylic acid dianhydride, 2,2-bis(3,4-dicarboxyphenyl)propane dianhydride, 3,4,9,10-perylenetetracarboxylic acid dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic acid dianhydride, bis(3,4-dicarboxyphenyl)sulfone dianhydride, p-phenylenebis(trimellitic acid monoester acid anhydride), ethylenebis(trimellitic acid monoester acid anhydride), (bisphenol A)bis(trimellitic acid monoester acid anhydride) and their analogs. These may be used singly or in a mixture of two or more at any ratio.

Diamines that can be used for synthesis of polyimide in the present invention include 4,4'-diaminodiphenylpropane, 4,4'-diaminodiphenylmethane, benzidine, 3,3'-dichlorobenzidine, 4,4'-diaminodiphenyl sulfide, 3,3'-diaminodiphenyl sulfone, 4,4'-diaminodiphenyl sulfone, 4,4'-diaminodiphenyl ether (4,4'-oxydianiline), 3,3'-diaminodiphenyl ether (3,3'-oxydianiline), 3,4'-diaminodiphenyl ether (3,4'-oxydianiline), 1,5-diaminonaphthalene, 4,4'-diaminodiphenyldiethylsilane, 4,4'-diaminodiphenylsilane, 4,4'-diaminodiphenylethylphosphine oxide, 4,4'-diaminodiphenyl N-methylaamine, 4,4'-diaminodiphenyl N-phenylamine, 1,4-diaminobenzene(p-phenylenediamine), 1,3-diaminobenzene, 1,2-diaminobenzene and their analogs. These may be used singly or in a mixture of two or more at any ratio.

In order to reduce the coefficient of linear expansion, increase the modulus of elasticity and increase the birefringence, it is preferable to use, as a raw material in particular, in production of a polyimide film in the present invention, an acid dianhydride represented by the following formula (1):

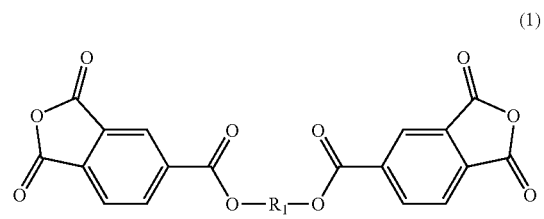

(1)

wherein $R_1$ is any selected from divalent organic groups included in the following formulas (2) to (14):

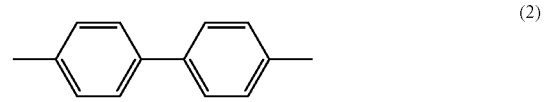

(2)

(3)

(4)

(5)

(6)

(7)

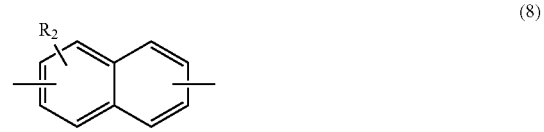

(8)

(9)

(10)

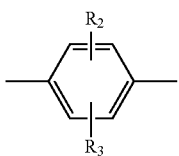
(11)

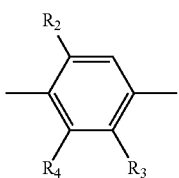
(12)

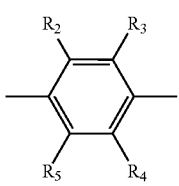
(13)

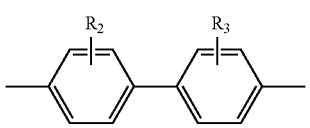
(14)

wherein each of $R_2$, $R_3$, $R_4$, and $R_5$ may be any selected from the group of —$CH_3$, —Cl, —Br, —F or —$OCH_3$.

A polyimide film having a relatively low water absorption is obtained by using the above-described acid dianhydride. This is preferable because foaming by moisture can be prevented in the graphitization process.

In particular, an organic group including a benzene nucleus represented by the formulas (2) to (14) is preferably used as $R_1$ in the acid dianhydride, because the resulting polyimide film has high molecular orientation, a small coefficient of linear expansion, a high modulus of elasticity, a high birefringence and a low water absorption.

In order to further reduce the coefficient of linear expansion, further increase the modulus of elasticity, further increase the birefringence and further reduce the water absorption, an acid dianhydride represented by the following formula (15) may be used as a raw material in synthesis of polyimide in the present invention.

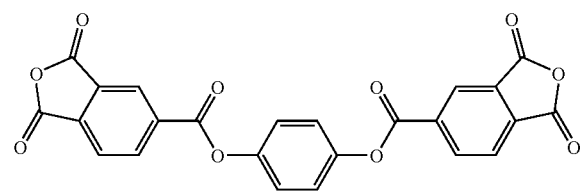
(15)

In particular, a polyimide film obtained using, as a raw material, an acid dianhydride having a structure in which benzene rings are linearly bonded through two or more ester bonds contains a flexing chain but tends to have an extremely linear conformation in its entirety and is relatively rigid. As a result, the coefficient of linear expansion of the polyimide film can be reduced to, for example, $1.5 \times 10^{-5}/°$ C. or less by using this raw material. Further, the modulus of elasticity can be increased to 500 kgf/$mm^2$ (4.9 GPa) or more and the water absorption can be reduced to 1.5% or less.

In order to further reduce the coefficient of linear expansion, further increase the modulus of elasticity and further increase the birefringence, polyimide in the present invention is preferably synthesized from p-phenylenediamine as a raw material.

The most appropriate diamines used for synthesis of polyimide in the present invention are 4,4'-oxydianiline and p-phenylenediamine. One or two of these diamines is preferably 40 mol % or more, more preferably 50 mol % or more, still more preferably 70 mol % or more, and yet more preferably 80 mol % or more in total based on the total diamines. Further, p-phenylenediamine is contained preferably at 10 mol % or more, more preferably 20 mol % or more, still more preferably 30 mol % or more, and yet more preferably 40 mol % or more. When the content of these diamines is less than the lower limit of the mol % ranges, the resulting polyimide film tends to have a high coefficient of linear expansion, a small modulus of elasticity and a small birefringence. However, when the total diamine content is the content of p-phenylenediamine, it is difficult to obtain a thick polyimide film in which only a small amount of foam is generated. Thus, it is preferable to use 4,4'-oxydianiline. Further, the carbon ratio is reduced, the amount of decomposition gas generated can be reduced, rearrangement of aromatic rings is less necessary, and a graphite having excellent appearance and thermal conductivity can be obtained.

The most appropriate acid dianhydrides used for synthesis of a polyimide film in the present invention are pyromellitic acid dianhydride and/or p-phenylenebis(trimellitic acid monoester acid dianhydride) represented by the formula (15). One or two of these acid dianhydrides is preferably 40 mol % or more, more preferably 50 mol % or more, still more preferably 70 mol % or more, and yet more preferably 80 mol % or more in total based on the total acid dianhydrides. When the amount of these acid dianhydrides used is less than 40 mol %, the resulting polyimide film tends to have a high coefficient of linear expansion, a small modulus of elasticity and a small birefringence.

Additives such as carbon black and graphite may be added to a polyimide film, polyamide acid or polyimide resin. The additives may be used singly or in a mixture of two or more at any ratio.

Preferable solvents for synthesizing a polyamide acid include amide solvents such as N,N-dimethylformamide, N,N-dimethylacetamide and N-methyl-2-pyrrolidone. N,N-dimethylformamide and N,N-dimethylacetamide may be particularly preferably used. The solvents may be used singly or in a mixture of two or more at any ratio.

Polyimide may be produced by a thermal cure method in which a polyamide acid as a precursor is converted into an imide by heating, or a chemical cure method in which a polyamide acid as a precursor is converted into an imide using a dehydrating agent represented by an acid anhydride such as acetic acid anhydride and an imidization promoter that is a tertiary amine such as picoline, quinoline, isoquinoline or pyridine. In particular, a high boiling imidization promoter such as isoquinoline is preferable. This is because the high boiling imidization promoter is not evaporated at the initial stage of preparation of the film and easily exhibits the catalytic effect even in the last process of drying. The chemical cure method is more preferable, particularly because the resulting film has a small coefficient of linear expansion, a high modulus of elasticity and a high birefringence, can be rapidly graphitized at a relatively low temperature, and can provide a graphite with high quality. The dehydrating agent and the imidization promoter are particularly preferably used in combination, because the resulting film has a high coefficient of linear expansion, a high modulus of elasticity and a high birefringence. The chemical cure method is an industrially advantageous method with excellent productivity, in which imidization reaction more rapidly proceeds and thus the imidization reaction can be completed in a short time in heating treatment.

When the film is specifically produced using the chemical cure method, a stoichiometric amount or more of a dehydrating agent and an imidization promoter made of a catalyst are first added to a polyamide acid solution; the mixture is cast on or applied to a support such as a support plate, an organic film of PET or the like, a drum or an endless belt to form a film; and the organic solvent is evaporated to obtain a self-supporting film. Then, the self-supporting film is further heated to dry and imidize the film, thereby obtaining a polyimide film. The temperature in the heating is preferably 150° C. to 550° C. The heating rate in heating is not specifically limited. It is preferable that heating be gradually carried out continuously or stepwise so that the highest temperature is within the predetermined temperature range. The heating time varies according to the thickness of the film and the highest temperature, and is generally preferably 10 seconds to 10 minutes after reaching the highest temperature. Further, the step of producing a polyimide film preferably includes a step of bringing the film into contact with a container, a step of fixing or holding the film or a step of stretching the film in order to prevent shrinkage, because the resulting film tends to have a small coefficient of linear expansion, a high modulus of elasticity and a high birefringence.

<Graphitization Method>

The graphitization of a polymer film of the present invention is carried out by thermally treating the film at a temperature of 2,000° C. or more and bringing the film into contact with a substance containing a metal during thermal treatment.

The thermal treatment has a step of carbonizing a polymer film and a step of graphitizing the polymer film. Carbonization and graphitization may be performed either separately or continuously.

Carbonization is performed by pre-heating a polymer film as a starting material under reduced pressure or in nitrogen gas. The pre-heating is carried out typically at a temperature of 800 to 1,500° C. The highest temperature of carbonization may be maintained for about 30 minutes to one hour after reaching the highest temperature. For example, when the film is heated at a rate of 10° C./min, the temperature of the film may be maintained in a temperature range of 1,000° C. for about 30 minutes. At the stage of heating, in order to retain molecular orientation of the starting polymer film, pressure may be applied in the direction perpendicular to the film surface to the extent that the film is not broken.

Graphitization may be carried out by once removing a carbonized polymer film and transferring the film in a graphitization furnace, or may be carried out continuously from carbonization. Graphitization is carried out under reduced pressure or in an inert gas. Argon or helium is appropriate for the inert gas. The thermal treatment temperature must be at least 2,000° C. or more. The final thermal treatment temperature is preferably 2,400° C. or more, more preferably 2,600° C. or more, and still more preferably 2,800° C. or more in order to obtain a graphite having excellent thermal conductivity, surface hardness, density, surface adhesion and appearance.

As the thermal treatment temperature is higher, the polymer film can be converted into a graphite with higher quality. From the economic point of view, it is preferable to convert the polymer film into a graphite with high quality at a temperature as low as possible. In order to realize an ultrahigh temperature of 2,500° C. or more, typically, current is directly caused to flow into a graphite heater and heating is carried out using Joule heat of the heater. The graphite heater is consumed at 2,700° C. or more. The consumption speed at 2,800° C. of the graphite heater is about 10 times that at 2,700° C., and the consumption speed at 2,900° C. of the graphite heater is about 10 times that at 2,800° C. Accordingly, it is considerably economically advantageous if the polymer film as a raw material is improved to reduce the temperature at which the polymer film can be converted into a graphite with high quality from 2,800° C. to 2,700° C., for example. The highest temperature at which thermal treatment can be carried out is 3,000° C. in a commonly available industrial furnace. After once carbonizing the polymer film and removing it, the carbonized polymer film may be graphitized. Alternatively, the polymer film may be continuously carbonized and graphitized.

<Method for fixing and Holding Polymer Film>

The thermal treatment of the present invention may be carried out by fixing a polymer film to a container. In an application in which heating to a temperature range of 2,000° C. is carried out as in the present invention, a container made of graphite is particularly preferable taking easiness in handling, industrial availability and the like into consideration. Graphite herein includes, in a broad sense, a material containing graphite as a main component insofar as the material can be heated to the above temperature range. Graphite may be isotropic graphite or extruded graphite, for example. When graphite is repeatedly used, isotropic graphite having excellent electrical conductivity, thermal conductivity and uniformity is preferable. The container may have any shape such as a shape of a simple flat plate. The container may also have a shape of a cylinder, and the polymer film may be wound around the container. The shape of the container is not specifically limited insofar as the polymer film can be brought into contact with the container.

The method of bringing the polymer film into contact with the inside of a container made of graphite (including a method of holding or fixing the film) may be each of a method of sandwiching the polymer film in a graphite plate and bringing the film into contact with the wall or bottom of the container while pressure other than the own weight of the graphite plate is not applied to the polymer film (in which the polymer film may be held by or fixed to the container) and a method of winding the polymer film around a cylindrical graphite container. However, the method is not necessarily limited to these methods.

<Method of Bringing Raw Material Film into Contact with Substance Containing Metal>

The method of bringing a polymer film into contact with a substance containing a metal may be a method of bringing into contact with a substance containing 1) a solid metal, 2) a liquid metal or 3) a gaseous metal during thermal treatment.

Specifically, the following methods (1) to (4) are preferable, for example.

(1) A method of forming a substance containing a metal on the surface of a polymer film before thermal treatment.

The method of forming a substance containing a metal on the surface may be a method of applying a substance containing a metal to the surface or a method of depositing a substance containing a metal on the surface. In this method, the polymer film is directly brought into contact with the substance containing a metal before thermal treatment starts. The substance containing a metal directly interacts with the polymer film during thermal treatment. Presumably, as the thermal treatment temperature is increased, the substance containing a metal is in a liquid state and/or a gaseous state, the substance more actively and uniformly interacts with the film.

(2) A method of forming a substance containing a metal on the surface of a carbonized polymer film before graphitization.

The operation in this method is the same as that in the method (1). However, a substance containing a metal is brought into contact with an already carbonized film, not a polymer film. The substance containing a metal directly interacts with the carbonized film during thermal treatment. Presumably, as the thermal treatment temperature is increased, the substance containing a metal is in a liquid state and/or a gaseous state, the substance interacts with the film. It is assumed that the method (2) is more preferable than the method (1). In the method (1), since the substance containing a metal is directly brought into contact with the polymer film during carbonization, the substance directly interacts with the polymer film in the carbonization process, and a side reaction may occur at the same time with carbonization. On the other hand, presumably, in the method (2), since the raw material is already carbonized, the raw material does not cause a side reaction during thermal treatment and a graphite with higher quality is obtained.

(3) A method of placing a polymer film or carbonized polymer film in a container having a metal.

The container having a metal may be a container already having a metal, a container in which a substance or powder containing a metal is placed, or the like. In this method, part of the polymer film or carbonized polymer film is brought into contact with the substance containing a metal, but it is assumed that the degree of contact is smaller than in the methods (1) and (2). It is assumed that, in the method (3), the substance containing a metal is diffused in a container during thermal treatment and sequentially brought into contact with the raw material film. Depending on the type of the substance containing a metal, the substance is a gas and brought into contact with the raw material in a gaseous state. It is assumed that the method (3) is more preferable than the method (1). In the method (3), the degree of contact is small at a low temperature, but the substance containing a metal is sufficiently brought into contact with the raw material film only at a high thermal treatment temperature. It is assumed that as a result, when the polymer film is used as a raw material, the film is difficult to interact with the substance containing a metal in the carbonization process in which the thermal treatment temperature is high, and it is difficult to cause a side reaction in carbonization. Further, in the method (3), the raw material film is brought into contact with the substance containing a metal only when the thermal treatment temperature is high and the substance containing a metal is highly dispersed. Since the degree of dispersion of the substance containing a metal is high, the substance extremely uniformly interacts with the whole surface of the film. The interaction is more uniform when the substance is in a gaseous state. As a result, a graphite having extremely high quality can be obtained.

(4) A method of adding a substance containing a metal to a polymer film.

The method may be specifically a method of adding fine particles in the form of powder. However, a method of adding a solution of a substance containing a metal to a polyamide acid solution before preparing polyimide is not preferable. This is because, when the metal in a molecular state is dispersed on the whole raw material film, a side reaction occurs in the process of preparing polyimide, making it difficult to obtain a uniform polyimide film. Further, when the substance is uniformly dispersed on the polyimide film, the degree of side reaction in the carbonization process is increased, making it difficult to obtain a graphite with high quality. This method is less preferable than the method (1).

<Substance Containing Metal>

The substance containing a metal may be a compound of a single metal element (of which examples include, but are not limited to, an oxide, nitride, halide, fluoride, chloride, bromide and iodide) or a metal salt. The substance containing a metal may be dissolved in a solvent when directly brought into contact with a raw material film. This is because the substance containing a metal can be uniformly brought into contact with the surface of the raw material film by application which is a simple method. The metal may be one or more selected from the group consisting of elements of Groups 4, 5, 6, 7, 8, 9, 10, 11, 12 and 13 such as aluminum and boron according to the IUPAC (International Union of Pure and Applied Chemistry) Nomenclature of Inorganic Chemistry, revised edition (1989), lithium, beryllium, sodium, magnesium, potassium, calcium, barium, silicon, germanium, selenium, tin, lead and bismuth. Among these, the metal is preferably one or more selected from the group consisting of titanium, vanadium, chromium, manganese, iron, cobalt, nickel, copper, zinc, zirconium, niobium, molybdenum, technetium, ruthenium, rhodium, palladium, silver, cadmium, hafnium, tantalum, tungsten, rhenium, osmium, iridium, platinum, gold, mercury, lithium, beryllium, magnesium, potassium, calcium, barium, aluminum, boron, silicon and germanium. The metal is more preferably one or more selected from the group consisting of titanium, vanadium, iron, cobalt and nickel. These metals are preferable because a thermal diffusivity, surface hardness, surface adhesion and appearance of the film are excellent.

<Graphitization of Polymer Film>

The graphitization mechanism of a polymer film will be described.

A polymer film is graphitized by two steps of carbonization and graphitization. First, carbonization generally refers to a process in which a polymer film is thermally treated to 1,000° C. to convert the film into a substance containing carbon as a main component. Specifically, when the polymer film is thermally treated at a decomposition temperature, the bond is cleaved and the decomposed component leaves as a gas such as carbon dioxide, carbon monoxide, nitrogen or hydrogen. When the film is thermally treated to 1,000° C., the film is a material containing carbon as a main component. Second, graphitization refers to a process in which a carbonaceous material is thermally treated at a temperature of 2,800° C. or more to convert the material into a structure having many graphite layers stacked, each layer of which has aromatic rings flatly connected with each other.

However, not all carbonaceous materials obtained by thermal treatment of polymers become graphite. Carbonaceous materials prepared by thermal treatment of epoxy or phenol resins do not become graphite and remain as glassy carbon even when thermally treated at a temperature of 2,800° C. or more. Only carbonaceous materials obtained by thermally treating limited polymer materials having aromatic rings such as polyimide and polyoxadiazole in which aromatic rings are in-plane oriented and heat resistance is high, become graphite.

<Graphitization of Polymer Film Including Polyimide Film>

As described above, a polymer film is graphitized through two steps of carbonization and graphitization. The polymer film is carbonized by thermal treatment, and then converted into a graphite structure by thermal treatment at a higher temperature. In this process, cleavage and recombination in a carbon-carbon bond must occur. In order to make graphitization occur as easily as possible, it is necessary to make the cleavage and recombination occur at a minimum energy. Molecular orientation of the starting polymer film (for example, polymer films listed above, in particular, a polyimide film) affects arrangement of carbon atoms in the carbonized film, and the molecular orientation can reduce the energy for cleavage and recombination of the bond in graphitization. Accordingly, graphitization can be promoted by designing molecules so that a high degree of molecular orientation easily occurs. The effect of the molecular orientation is more significant when the molecular orientation is a two-dimensional molecular orientation parallel with the film surface. However, a substance containing a metal is brought into contact with the polymer film as a starting material, the substance interacts with the polymer film during thermal treatment, and cleavage and recombination of an original carbon-carbon bond and arrangement of carbon atoms in carbonization may be adversely affected. Therefore, a carbonized film is preferably used as a starting material.

The second feature of graphitization reaction is that the polymer film is difficult to be graphitized when the film is thick. Accordingly, when the thick polymer film is graphitized, a graphite structure may not be formed in the inside of the film even if a graphite structure is formed in the surface layer. Molecular orientation of the polymer film promotes graphitization in the film and, as a result, the polymer film can be converted into a graphite with high quality at a low temperature.

The surface layer and the inside of the polymer film are graphitized almost at the same time by improving a plane orientation of the polymer film, so that a graphite structure formed in the surface layer can be prevented from being broken by gas generated in the film and a thicker film can be graphitized. The polymer film used in the present invention (for example, polymer films listed above, in particular, a polyimide film) is assumed to have a molecular orientation most suitable for generating such an effect. However, when the polymer film is not brought into contact with a metal, the film is graphitized too much and graphite may be separated from the surface of the film, if the film has a too high plane orientation. Therefore, it is extremely difficult to improve the plane orientation of the raw material film and obtain a uniformly clear graphite at the same time. On the other hand, when a polymer film having a high plane orientation is used as a raw material and the raw material is brought into contact with a metal to thermally treat the material, a problem of separation of graphite from the surface can be solved which has not been solved by the prior art, and furthermore a graphite can be obtained having excellent thermal conductivity, surface hardness, density and surface adhesion. An effect that cannot be expected in the prior art can be achieved by bringing a polymer film having a high plane orientation into contact with a metal to thermally treat the film.

<Conventional Graphitization in which Raw Material Film is Not Brought into Contact with Substance Containing Metal>

In conventional graphitization in which a raw material film is not brought into contact with a substance containing a metal, a graphite having excellent thermal conductivity can be obtained by thermal treatment, but there is room for improvement in surface hardness, surface adhesion and appearance of the graphite film. In particular, as the raw material film is thicker, this tendency is more significant. The reasons will be described.

In conventional graphitization in which a raw material film is not brought into contact with a substance containing a metal, carbonization and graphitization occurs first on the surface of the raw material film and then the inside of the film. As a result, when the surface dense layer encloses decomposition gas derived from the uncarbonized component remaining in the inside and the film is heated to a high temperature, the gas remaining in the inside breaks the surface layer and escapes; separation occurs on the surface; and, as a result, there may be room for improvement in appearance. Further, when graphene layers are rearranged in the graphitization process, decomposition gas is generated from a excess graphene layer that cannot be rearranged, breaks the surface layer and escapes; separation occurs on the surface; and, as a result, there may be room for improvement in appearance. Moreover, only the surface part is graphitized and the film receives an internal strain, so that the surface graphite layer is easily eliminated. Alternatively, the film is graphitized too much in its entirety and thus separation between planes easily occurs, so that the graphite layer is easily eliminated. As a result, there may be room for improvement in these respects.

Consequently, a fragile layer is formed on the surface because the surface is broken or separated. As a result, there may still be room for improvement in surface hardness, surface adhesion and appearance. Therefore, it is still extremely difficult to obtain a graphite with high thermal conductivity which has excellent surface hardness, surface adhesion and appearance together. Furthermore, since the degree of carbonization and graphitization during thermal treatment differs between the surface and the inside more significantly in a thick raw material than in a thin raw material, there is still room for improvement in each property in the thick raw material in many cases.

<Graphitization of Present Invention in which Raw Material Film is Brought into Contact with Substance Containing Metal>

However, in the present invention, when a film is brought into contact with a substance containing a metal to graphitize the film, a graphite with high thermal conductivity which has excellent surface hardness, surface adhesion and appearance together can be obtained which has been conventionally difficult to be obtained. Next, there will be described the effect of a metal when the film is brought into contact with a substance containing a metal and graphitized.

In conventional graphitization in which a film is not brought into contact with a substance containing a metal, the surface layer is broken by decomposition gas or vaporization of an excess graphene component; or graphite is eliminated by partial graphitization of the surface layer and excessive graphitization.

On the other hand, it is assumed that, when a substance containing a metal is brought into contact with a film to thermally treat the film, graphitization of the surface part is controlled, excessive graphitization is prevented, and the whole film is uniformly graphitized.

It is assumed that, even if part of the surface part is nearly separated due to excessive graphitization of the surface, separation edges, which are highly reactive, are loosely connected with each other through a metal due to contact with a substance containing the metal to prevent separation. However, when the surface graphite layer is retained and maintained by such a metal, the metal may be an impurity to degrade thermal conductivity. However, it is assumed that, after gas generation in the film finishes and the surface and the inside are uniformly graphitized, the film is thermodynamically stable graphite not containing a metal, so that the metal connecting the edges is removed, the edges are combined again, and the metal is excluded from the carbon bonding.

Furthermore, a graphitization temperature of 2,000° C. or more exceeds a boiling point of a compound containing a metal. Thus, it is assumed that a substance containing a metal is vaporized in the graphitization process to finally provide a substance made only of carbon and not containing an impurity, thereby obtaining a graphite having excellent thermal conductivity.

As described above, when a film is graphitized by bringing it into contact with a substance containing a metal, the surface and the inside are uniformly graphitized and a graphite having excellent thermal conductivity is obtained. Further, since surface edges do not exist and surface graphite is formed by sufficient bonding, a graphite can be obtained having high surface hardness, excellent surface adhesion to an adhesive or pressure sensitive adhesive and having excellent appearance in which the surface is dense without separation.

The reason for which and the mechanism in which the process for producing a graphite film of the present invention is superior to a conventional production process and the reason for which and the mechanism in which the graphite film of the present invention exhibit properties superior to those of a graphite film by a conventional production process are assumed to be as described above, although it is necessary to perform further academic studies with regard to the reasons and mechanisms.

<Properties of Resulting Graphite Film>

The graphite film prepared by the production process of the present invention may have a thermal diffusivity of $7.0 \times 10^{-4}$ m$^2$/s or more, preferably $8.0 \times 10^{-4}$ m$^2$/s, and more preferably $8.5 \times 10^{-4}$ m$^2$/s. When the thermal diffusivity is $7.0 \times 10^{-4}$ m$^2$/s or more, thermal diffusivity is high, and thus heat easily escapes from heat generating equipment and an increase in temperature of the heat generating equipment can be suppressed. On the other hand, when the thermal diffusivity is less than $7.0 \times 10^{-4}$ m$^2$/s, thermal diffusivity is low, and thus heat cannot escape from heat generating equipment and an increase in temperature of the heat generating equipment cannot be suppressed.

With regard to surface hardness, the graphite film prepared by the production process of the present invention has a pencil hardness measured based on JIS K 5400 of 2B or more, preferably B or more, and more preferably HB or more. The graphite having a pencil hardness of 2B or more has surface hardness sufficient so that the surface of the graphite is not damaged when attached or handled.

With regard to surface adhesion, the graphite film prepared by the production process of the present invention has an adhesive force measured based on the "Testing methods of pressure sensitive adhesive tapes and sheets" of JIS Z 0237 of 3 N/cm or more, preferably 4 N/cm or more, and more preferably 5 N/cm or more. When the graphite having a pencil hardness of 3 N/cm or more is attached to a heat generating component using an adhesive or pressure sensitive adhesive, the graphite is not separated and can exhibit heat radiation properties inherent to the graphite.

With regard to surface appearance, the graphite film prepared by the production process of the present invention specifically has a rating measured by the "X-cut tape method" of JIS K5400 of 6 or more, and preferably 8 or more. When the appearance rating is 6 or more, the graphite attached to a heat generating component using an adhesive or pressure sensitive adhesive is not separated. Further, graphite is not separated from the surface of the graphite by touching during installing the graphite in an apparatus or by air from a fan after bringing the graphite into contact with the heat generating component and does not contaminate the inside of electronics.

The graphite film prepared by the production process of the present invention specifically has a thickness of 50 μm or more, preferably 70 μm or more, and more preferably 90 μm or more. The raw material polymer film used has a thickness of 70 μm or more, preferably 120 μm or more, and more preferably 150 μm or more. When the graphite film has a thickness of 50 μm or more and the raw material film has a thickness of 70 μm or more, the graphite film can transport a larger amount of heat and can exhibit heat radiation properties superior to those of a conventional graphite film.

As described above, the process for producing a graphite film in which a polymer film is thermally treated at a temperature of 2,000° C. or more according to the present invention, the process comprising the step of bringing a polymer film into contact with a substance containing a metal during thermal treatment can produce a graphite film having thermal conductivity, surface hardness, surface adhesion and appearance superior to those of a conventional graphite film. Further, a thick graphite film in which each of such properties is excellent can be produced.

Various examples of the present invention will be described together with some comparative examples.

EXAMPLES (Preparation of Polyimide Film A)

One equivalent of pyromellitic acid dianhydride was dissolved in a solution of 1 equivalent of 4,4-oxydianiline in DMF (dimethylformamide) to obtain a polyamide acid solution (18.5 wt %).

While cooling this solution, an imidization catalyst containing 1 equivalent of acetic acid anhydride, 1 equivalent of isoquinoline and DMF was added for a carboxylic acid group contained in polyamide acid and thereafter the solution was defoamed. Next, the mixed solution was applied to an aluminum foil at a predetermined thickness after drying. The mixed solution layer on the aluminum foil was dried using a hot air oven and a far infrared heater.

The drying conditions for preparing a film having a final thickness of 75 μm will be described. The mixed solution layer on the aluminum foil was dried in a hot air oven at 120° C. for 240 seconds to be a self-supporting gel film. The gel film was separated from the aluminum foil, brought into contact with a frame and fixed and held. Further, the gel film was dried stepwise in a hot air oven at 120° C. for 30 seconds, at 275° C. for 40 seconds, at 400° C. for 43 seconds and at 450° C. for 50 seconds and in a far infrared heater at 460° C. for 23 seconds.

A polyimide film having a thickness of 75 μm (polyimide film A: modulus of elasticity 3.1 GPa, water absorption 2.5%, birefringence 0.10, coefficient of linear expansion $3.0 \times 10^{-5}$/° C.) was produced in the above manner. When preparing a film having another thickness, the firing time was controlled in proportion with the thickness. For example, the firing time for a film having a thickness of 125 μm or 225 μm was 5/3 times or 3 times, respectively, based on the firing time for a film having a thickness of 75 μm. When preparing a thick film, it is necessary to ensure a sufficient firing time at a low temperature in order to prevent foaming due to evaporation of the solvent or imidization catalyst from the polyimide film.

In actual graphitization, a polyimide film of Apical(R) AH manufactured by Kaneka Corporation having a thickness of 75, 125 or 225 μm was used which was prepared by the same method as above.

(Method for Preparing Polyimide film B)

A polyimide film having a thickness of 75 μm, 125 μm or 225 μm (polyimide film B: modulus of elasticity 4.1 GPa, water absorption 2.1%, birefringence 0.14, coefficient of linear expansion $1.6 \times 10^{-5}$/° C.) was produced in the same manner as in Example 1, except for using, as a polyamide acid, a polyamide acid obtained by dissolving 4 equivalents of pyromellitic acid dianhydride in a solution of 3 equivalents of 4,4'-oxydianiline in DMF to synthesize a prepolymer having an acid anhydride at each terminal and dissolving 1 equivalent of p-phenylenediamine in the solution containing the prepolymer.

In actual graphitization, a polyimide film of Apical(R) NPI manufactured by Kaneka Corporation having a thickness of 75, 125 or 225 μm was used which was prepared by the same method as above.

(Method for Preparing Polyimide Film C)

A polyimide film having a thickness of 75 μm or 125 μm (polyimide film C: modulus of elasticity 4.9 GPa, water absorption 3.0%, birefringence 0.14, coefficient of linear expansion $1.5 \times 10^{-5}/°C$.) was produced in the same manner as in Example 1, except for using, as a polyamide acid, a polyamide acid obtained by dissolving 2 equivalents of pyromellitic acid dianhydride in a solution of 1 equivalent of 4,4'-oxydianiline and 1 equivalent of p-phenylenediamine in DMF (dimethylformamide).

(Method for Preparing Carbonized Film A, B or C)

A polyimide film A, B or C was sandwiched in a graphite plate, heated to 1,000° C. in a nitrogen atmosphere using an electric furnace, and then thermally treated at 1,000° C. for one hour to carry out carbonization treatment. The carbonized film was a carbonized film A', B' or C'.

Examples 1 to 5

A 5 wt % solution of ferrous chloride, ferric sulfate, iron nitrate, cobalt chloride or cobalt sulfate in methanol was applied to the carbonized film A' obtained from the polyimide film having a thickness of 75 μm or 125 μm. Then, the film was sandwiched in a graphite plate, heated to 2,1 00° C. under reduced pressure and to 3,000° C. from 2,100° C. in an argon atmosphere in a graphitization furnace, and thermally treated at 3,000° C. for one hour to carry out graphitization treatment. A graphite film was thus prepared.

Example 6

A 5 wt % solution of iron nitrate in methanol was applied to the polyimide film A obtained from the polyimide film having a thickness of 75 μm or 125 μm. Then, the film was sandwiched in a graphite plate, heated to 2,1 00° C. under reduced pressure and to 3,000° C. from 2,1 00° C. in an argon atmosphere in a graphitization furnace, and thermally treated at 3,000° C. for one hour to carry out graphitization treatment and carbonization treatment continuously. A graphite film was thus prepared.

Examples 7 and 8

A graphite film was prepared in the same manner as in Example 3, except for using graphite containing iron at 0.1% for a graphite container and a graphite plate.

Example 9

A graphite film was prepared in the same manner as in Example 3, except that graphite containing iron at 0.1% was used for a graphite container and a graphite plate and the container was an angular container having a closed structure with a cover.

Example 10

A graphite film was prepared in the same manner as in Example 3, except for using graphite to which a 5 wt % solution of iron nitrate in methanol was applied for a graphite container and a graphite plate.

Example 11

A graphite film was prepared in the same manner as in Example 3, except that a fine iron oxide powder was spread over a graphite container and a graphite plate.

Example 12

A graphite film was prepared in the same manner as in Example 3, except for using, as a raw material film, the carbonized film A' containing a fine iron oxide powder at 0.5 wt % which was obtained from the polyimide film having a thickness of 75 μm or 125 μm.

Examples 13 to 15

A graphite film was prepared in the same manner as in Example 3, except for using, as a raw material film, the carbonized film B' obtained from the polyimide film B having a thickness of 75 μm or 125 μm, the polyimide film B having a thickness of 75 μm or 125 μm, or the carbonized film C' obtained from the polyimide film C having a thickness of 75 μm or 125 μm.

Example 16

A graphite film was prepared in the same manner as in Example 8, except for using, as a raw material film, the carbonized film B' obtained from the polyimide film having a thickness of 75 μm or 125 μm.

Examples 17 and 18

A graphite film was prepared in the same manner as in Example 3, except for using the carbonized film A' or B' obtained from the polyimide film having a thickness of 225 μm as a raw material film and a 25 wt % solution of iron nitrate in methanol.

Examples 19 and 20

A graphite film was prepared in the same manner as in Examples 3 and 13, except that the highest firing temperature was 2,800° C.

Comparative Examples 1 and 2

The carbonized film A' obtained from the polyimide film having a thickness of 75 μm or 125 μm was sandwiched in a graphite plate, heated to 2,100° C. under reduced pressure and to 2,800° C. from 2,100° C. in an argon atmosphere in a graphitization furnace, and thermally treated at 2,800° C. for one hour to carry out graphitization treatment. A graphite film was thus prepared.

Comparative Examples 3 and 4

A graphite film was prepared in the same manner as in Comparative Examples 1 and 2, except that the highest firing temperature was 3,000° C. The thermal diffusivity, pencil hardness (value representing surface hardness), density, surface adhesion property (value representing surface adhesion) and appearance of the graphite films obtained in Examples 1 to 20 and Comparative Examples 1 to 4 are shown in Tables 1 to 6. The raw material thickness is a thickness of the polymer film before carbonization.

TABLE 1

| | Example | | | | | |
|---|---|---|---|---|---|---|
| | 1 | 2 | 3 | 4 | 5 | 6 |
| Polyimide film | A | A | A | A | A | A |
| Method of bringing into contact with metal compound (type of metal compound) | Application of metal compound solution | | | | | |
| | 5% iron chloride solution | 5% iron sulfate solution | 5% iron nitrate solution | 5% cobalt chloride solution | 5% cobalt sulfate solution | 5% iron nitrate solution |
| Raw material for graphitization | Carbonized film | | | | | Polyimide film |
| Raw material thickness 75 μm — Thermal diffusivity ($10^{-4}$ m$^2$/s) | 8.5 | 8.5 | 8.6 | 8.3 | 8.2 | 8.2 |
| Pencil hardness | HB | HB | HB | HB | HB | HB |
| Density (g/cm$^3$) | 2.1 | 2.1 | 2.12 | 2.1 | 2.1 | 2.05 |
| Peel strength (N/cm) | 5.0 | 5.1 | 5.4 | 5.0 | 5.0 | 4.8 |
| Appearance | 8 | 8 | 8 | 8 | 8 | 8 |
| Raw material thickness 125 μm — Thermal diffusivity ($10^{-4}$ m$^2$/s) | 8.0 | 8.1 | 8.1 | 8.0 | 8.0 | 7.8 |
| Pencil hardness | HB | HB | HB | HB | HB | HB |
| Density (g/cm$^3$) | 2.08 | 2.07 | 2.1 | 2.07 | 2.08 | 2.0 |
| Peel strength (N/cm) | 5.0 | 5.0 | 5.3 | 5.0 | 5.0 | 4.5 |
| Appearance | 8 | 8 | 8 | 8 | 8 | 8 |

TABLE 2

| | Example | | | | | |
|---|---|---|---|---|---|---|
| | 7 | 8 | 9 | 10 | 11 | 12 |
| Polyimide film | A | A | A | A | A | A |
| Method of bringing into contact with metal compound | Container having iron | Container having iron | Container having iron which can be closed | Placing in closed container after applying iron solution | Spreading iron oxide powder over container | Polyimide film containing iron oxide |
| Raw material for graphitization | Polyimide film | Carbonized film | Carbonized film | Carbonized film | Polyimide film | |
| Raw material thickness 75 μm — Thermal diffusivity ($10^{-4}$ m$^2$/s) | 8.4 | 8.6 | 8.7 | 8.7 | 8.5 | 7.2 |
| Pencil hardness | HB | HB | HB | HB | HB | HB |
| Density (g/cm$^3$) | 2.1 | 2.15 | 2.15 | 2.15 | 2.13 | 2.05 |
| Peel strength (N/cm) | 5.0 | 5.2 | 5.3 | 5.3 | 5.0 | 4.3 |
| Appearance | 8 | 8 | 8 | 8 | 8 | 8 |
| Raw material thickness 125 μm — Thermal diffusivity ($10^{-4}$ m$^2$/s) | 8.0 | 8.2 | 8.3 | 8.3 | 8.0 | 7.0 |
| Pencil hardness | HB | HB | HB | HB | HB | HB |
| Density (g/cm$^3$) | 2.07 | 2.12 | 2.13 | 2.13 | 2.0 | 2.0 |
| Peel strength (N/cm) | 5.0 | 5.2 | 5.3 | 5.3 | 5.0 | 4.0 |
| Appearance | 8 | 8 | 8 | 8 | 8 | 8 |

TABLE 3

| | Example | | | |
|---|---|---|---|---|
| | 13 | 14 | 15 | 16 |
| Polyimide film | B | B | C | B |
| Method of bringing into contact with metal compound | Application of 5% iron nitrate solution | | | Container having iron |
| Raw material for graphitization | Carbonized film | Polyimide film | Carbonized film | Carbonized film |
| Raw material thickness 75 μm — Thermal diffusivity ($10^{-4}$ m$^2$/s) | 9.5 | 9.3 | 9.2 | 9.6 |
| Pencil hardness | HB | HB | HB | HB |
| Density (g/cm$^3$) | 2.18 | 2.15 | 2.16 | 2.18 |
| Peel strength (N/cm) | 5.4 | 4.8 | 5.0 | 5.2 |
| Appearance | 8 | 8 | 8 | 8 |
| Raw material thickness 125 μm — Thermal diffusivity ($10^{-4}$ m$^2$/s) | 9.3 | 9.0 | 8.8 | 9.4 |
| Pencil hardness | HB | HB | HB | HB |
| Density (g/cm$^3$) | 2.17 | 2.14 | 2.13 | 2.17 |
| Peel strength (N/cm) | 5.3 | 4.5 | 5.2 | 5.2 |
| Appearance | 8 | 8 | 8 | 8 |

TABLE 4

|  |  | Example | |
|---|---|---|---|
|  |  | 17 | 18 |
| Polyimide film | | A | B |
| Method of bringing into contact with metal compound | | Application of 25% iron nitrate solution | |
| Raw material for graphitization | | Carbonized film | |
| Raw material thickness 225 μm | Thermal diffusivity ($10^{-4}$ m$^2$/s) | 8.0 | 8.5 |
|  | Pencil hardness | HB | HB |
|  | Density (g/cm$^3$) | 2.0 | 2.02 |
|  | Peel strength (N/cm) | 5.0 | 5.0 |
|  | Appearance | 8 | 8 |

TABLE 5

|  |  | Example | |
|---|---|---|---|
|  |  | 19 | 20 |
| Polyimide film | | A | B |
| Method of bringing into contact with metal compound | | Application of 5% iron nitrate solution | |
| Raw material for graphitization | | Carbonized film | |
| Highest firing temperature | | 2800° C. | 2800° C. |
| Raw material thickness 75 μm | Thermal diffusivity ($10^{-4}$ m$^2$/s) | 7.3 | 7.9 |
|  | Pencil hardness | B | B |
|  | Density (g/cm$^3$) | 2.0 | 2.05 |
|  | Peel strength (N/cm) | 4.0 | 4.0 |
|  | Appearance | 8 | 8 |
| Raw material thickness 125 μm | Thermal diffusivity ($10^{-4}$ m$^2$/s) | 7.1 | 7.6 |
|  | Pencil hardness | B | B |
|  | Density (g/cm$^3$) | 2.0 | 2.05 |
|  | Peel strength (N/cm) | 4.0 | 4.0 |
|  | Appearance | 8 | 8 |

TABLE 6

|  |  | Comparative Example | | | |
|---|---|---|---|---|---|
|  |  | 1 | 2 | 3 | 4 |
| Polyimide film | | A | B | A | B |
| Method of bringing into contact with metal compound | | Without application | | | |
| Raw material for graphitization | | Carbonized film | | | |
| Highest firing temperature | | 2800° C. | | 3000° C. | |
| Raw material thickness 75 μm | Thermal diffusivity ($10^{-4}$ m$^2$/s) | 6.9 | 7.5 | 7.5 | 7.9 |
|  | Pencil hardness | <5B | <5B | <5B | <5B |
|  | Density (g/cm$^3$) | 0.8 | 1.85 | 0.7 | 1.9 |
|  | Peel strength (N/cm) | <1 | <1 | <1 | <1 |
|  | Appearance | 2 | 2 | 2 | 2 |
| Raw material thickness 125 μm | Thermal diffusivity ($10^{-4}$ m$^2$/s) | 6.4 | 7.3 | 7.3 | 7.8 |
|  | Pencil hardness | <5B | <5B | <5B | <5B |
|  | Density (g/cm$^3$) | 0.8 | 1.7 | 0.7 | 1.8 |
|  | Peel strength (N/cm) | <1 | <1 | <1 | <1 |
|  | Appearance | 2 | 2 | 2 | 2 |
| Raw material thickness 225 μm | Thermal diffusivity ($10^{-4}$ m$^2$/s) | 1.2 | 6.5 | 2.0 | 7.0 |
|  | Pencil hardness | <5B | <5B | <5B | <5B |
|  | Density (g/cm$^3$) | 0.8 | 1.5 | 0.7 | 1.6 |
|  | Peel strength (N/cm) | <1 | <1 | <1 | <1 |
|  | Appearance | 0 | 0 | 0 | 0 |

The thermal diffusivity of the graphite film was measured by measuring the thermal diffusivity of a graphite film of 4 mm×40 mm using a thermal diffusivity meter using an Laser heating AC method ("LaserPit" available from ULVAC-RIKO, Inc.) in an atmosphere at 20° C. at 10 Hz. The progress of graphitization was evaluated by measuring the thermal diffusivity in the in-plane direction of the film. As the thermal diffusivity is higher, graphitization is more significant.

The pencil hardness of the graphite film was evaluated according to 8.4.1 Testing machine method in "Testing methods for paints" of JIS K 5400 (1990)(JIS K 5600 (1999)). The evaluation value was represented by a pencil hardness such as 2B, B, HB or H. In this order, the surface hardness is higher and the graphite surface hardness is higher.

The density of the graphite film was calculated by dividing the weight (g) of the graphite film by the volume (cm$^3$) of the graphite film calculated as a product of the length, width and thickness of the film. As the thickness of the graphite film, an average of values measured at any 10 points was used. As the density is higher, graphitization is more significant.

The peel strength of the graphite film was evaluated according to the "Testing methods of pressure sensitive adhesive tapes and sheets" of JIS Z 0237 (1980). As the value is higher, surface adhesion to an adhesive or pressure sensitive adhesive is higher.

The appearance of the graphite film was evaluated according to 8.5.3 X-cut tape method in "Testing methods for paints" of JIS K 5400 (1990)(JIS K 5600 (1999)). The value is represented in the range of 0 to 10. As the value is higher, separation from the surface is small and the graphite has excellent appearance.

Any of the graphite films obtained in Examples 1 to 20 had a thermal diffusivity of $7.0 \times 10^{-4}$ m$^2$/S or more, a pencil hardness of B or more, a density of 2.0 g/cm$^3$ or more, a peel strength of 4 N/cm or more and an appearance of 8 or more, and had excellent thermal conductivity, surface hardness, surface adhesion and appearance.

On the other hand, some of the graphite films obtained in Comparative Examples 1 to 4 had a high thermal diffusivity, but the graphite films had a pencil hardness of 5B or less, a density of less than 2.0 g/cm$^3$, a peel strength of less than 1 N/cm and an appearance of 0, and thus did not have excellent thermal conductivity, surface hardness, surface adhesion and appearance.

Properties of the graphite film of Example 3 were respectively superior to those of the graphite film of Example 6. A substance containing a metal was applied to a carbonized film in Example 3, whereas a substance containing a metal was applied to a polyimide film in Example 6. As is clear from the above results, properties of a graphite film obtained by applying a substance containing a metal to a carbonized film are superior to those of a graphite film obtained by applying a substance containing a metal to a polymer film.

Properties of the graphite film of Example 8 were respectively superior to those of the graphite film of Example 3; and properties of the graphite film of Example 7 were respectively superior to those of the graphite film of Example 6. It is assumed that a graphite having more excellent properties is obtained by bringing a film into contact with a container having a metal rather than directly bringing a film into contact with a substance containing a metal, because the metal can be uniformly brought into contact with the raw material without unevenness. Further, it is assumed that a container could be closed in Example 9, so that a film could be more uniformly brought into contact with a metal. The fact that the effect of a metal could be exhibited even if a raw material film was brought into contact with a container, not directly with a substance containing a metal, in Examples 7 to 11 shows that the metal was dispersed during heating.

The graphite film of Example 12, in which a fine iron oxide powder was added to a raw material film, had improved hardness, surface adhesion and appearance, but was most inferior among the graphite films of Examples in terms of properties. It is assumed that iron oxide was also present in the film, so that the degree of carbonization and graphitization was smaller than in other Examples.

Properties of the graphite film of Example 13 were more well-balanced than those of the graphite film of Example 3; properties of the graphite film of Example 14 were more well-balanced than those of the graphite film of Example 6; and properties of the graphite film of Example 16 were more well-balanced than those of the graphite film of Example 8. It is assumed that this is because the starting material was produced by sequence control in Examples 13, 14 and 16, so that molecules were easily rearranged during graphitization. It is also assumed that the starting material had a high carbon ratio, so that the amount of decomposition gas was small and the starting material was smoothly graphitized.

The graphite film of Example 3, the graphite film of Example 15 and the graphite film of Example 13 were superior in this order in terms of properties. It is assumed that the graphite films of Example 15 and 13 were superior to the graphite film of Example 3, because the birefringence and modulus of elasticity were higher and the coefficient of linear expansion was smaller in the raw material used in Example 15 or 13 than in the raw material used in Example 3, and this made it easy to rearrange molecules during graphitization in Examples 15 and 13. It is assumed that the graphite film of Example 13 was superior to the graphite film of Example 15, because the starting material was produced by sequence control, so that molecules were easily rearranged during graphitization. It is also assumed that the starting material had a high carbon ratio, so that the amount of decomposition gas was small and the starting material was smoothly graphitized.

Figure 3:
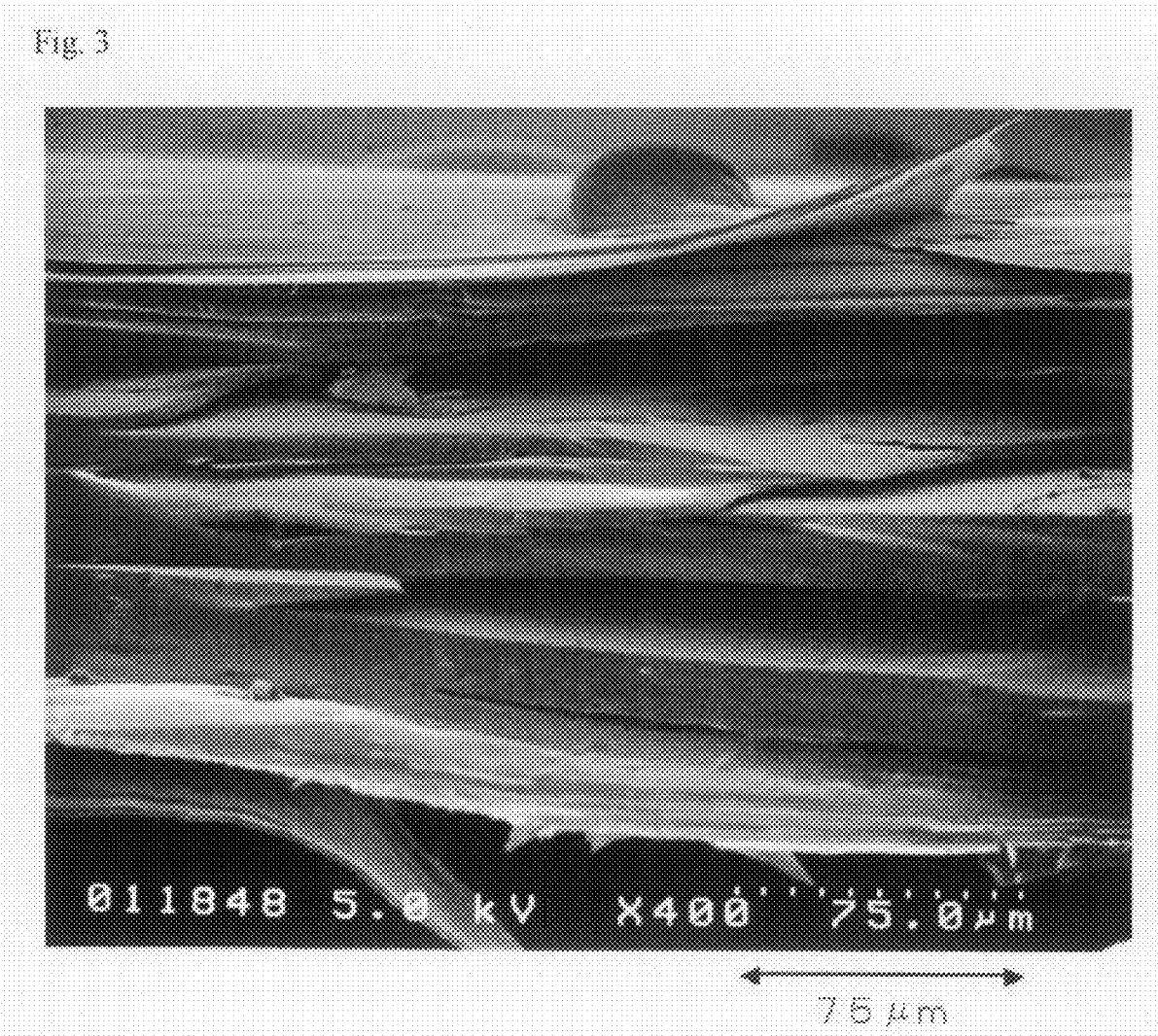
FIG. 3 is a cross-sectional SEM photograph of a polyimide film A having a thickness of 225 μm after graphitization.

In Examples 17 and 18, a polyimide film having a thickness of 225 μm was used as a raw material polymer film. However, a graphite film having sufficiently excellent properties was obtained from such a thick film. The graphite films of Examples 17 and 18 are compared with the graphite films of Comparative Examples 3 and 4 to find that the effect of a metal is particularly significant when the raw material film is thick. FIG. 3 is a cross-sectional SEM photograph of the graphite film of Comparative Example 1 obtained by thermally treating the polyimide film A having a thickness of 225 μm. As is clear from this cross-sectional photograph, cracks and/or signs of cracks were generated in part of the inside of the film, and the surface layer and the inner layer of the film were wholly cracked and broken. It is assumed that this is because gas generated in the thermal treatment process could not escape well and foam was generated. In particular, it is presumed that a surface graphite layer was developed in the thick film and gas was difficult to escape. Further, it is presumed that interaction in the film was weak, so that the film was cracked by the internal stress when the film was thick.

Figure 4:
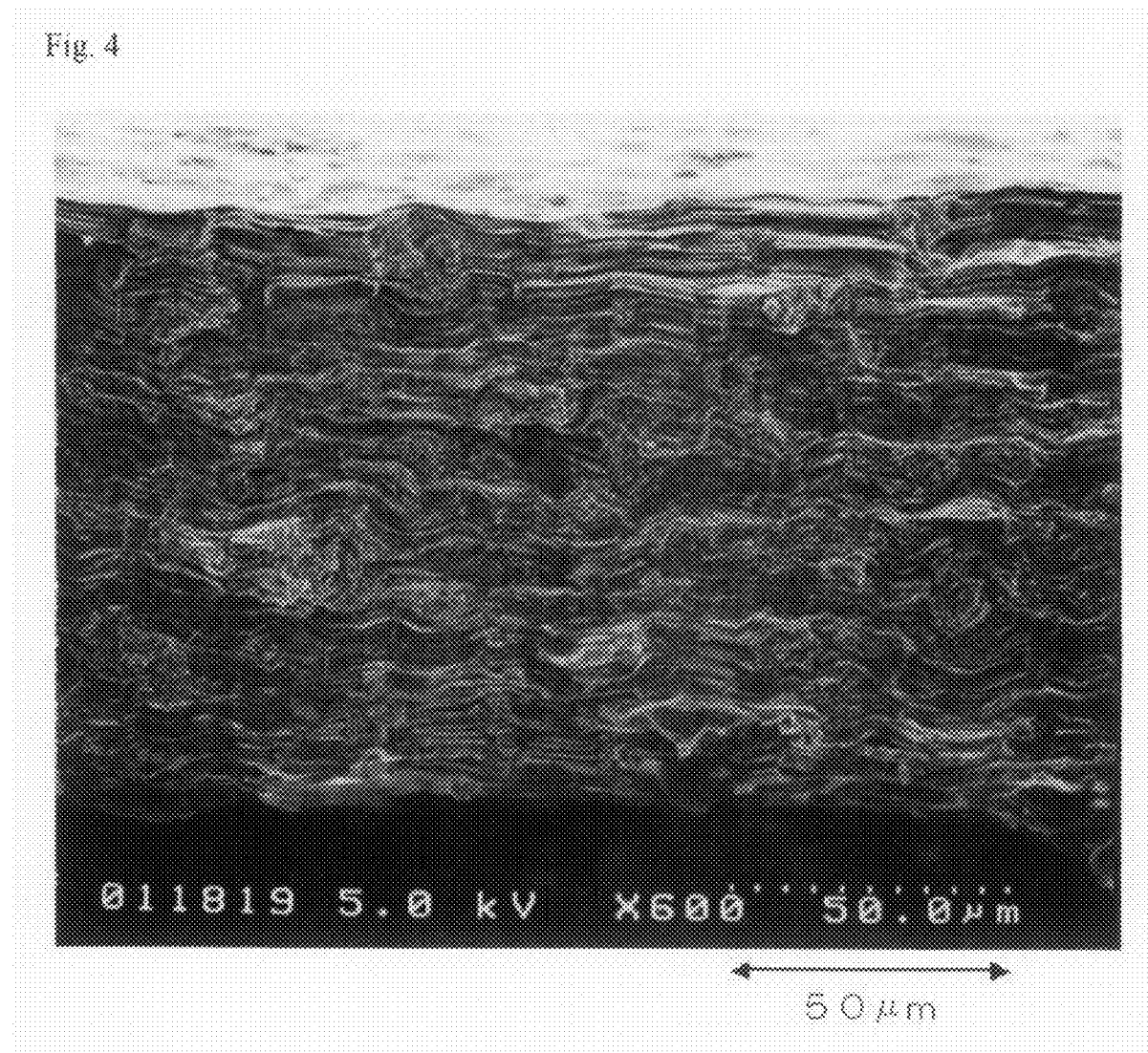
FIG. 4 is a cross-sectional SEM photograph of a polyimide film A having a thickness of 225 μm after graphitization by bringing the film into contact with a metal-containing substance.

On the other hand, FIG. 4 is a cross-sectional SEM photograph of the graphite film of Example 17 obtained by thermally treating the polyimide film A having a thickness of 225 μm. As is clear from this cross-sectional photograph, the film was entirely graphitized, and an extremely dense graphite film was formed with no voids in the film. It is assumed that as a result, a graphite film having various excellent properties was formed. It is assumed that a dense graphite was obtained unlike Comparative Example 1, because a non-uniform layer or non-uniform phase was formed in the film during thermal treatment, gas generated in the thermal treatment process could escape well, and thus the film was not broken. It is presumed that the non-uniform layer or non-uniform phase in the film prevented separation between graphite layers and suppressed cracking of the film by the internal stress.

Figure 5:
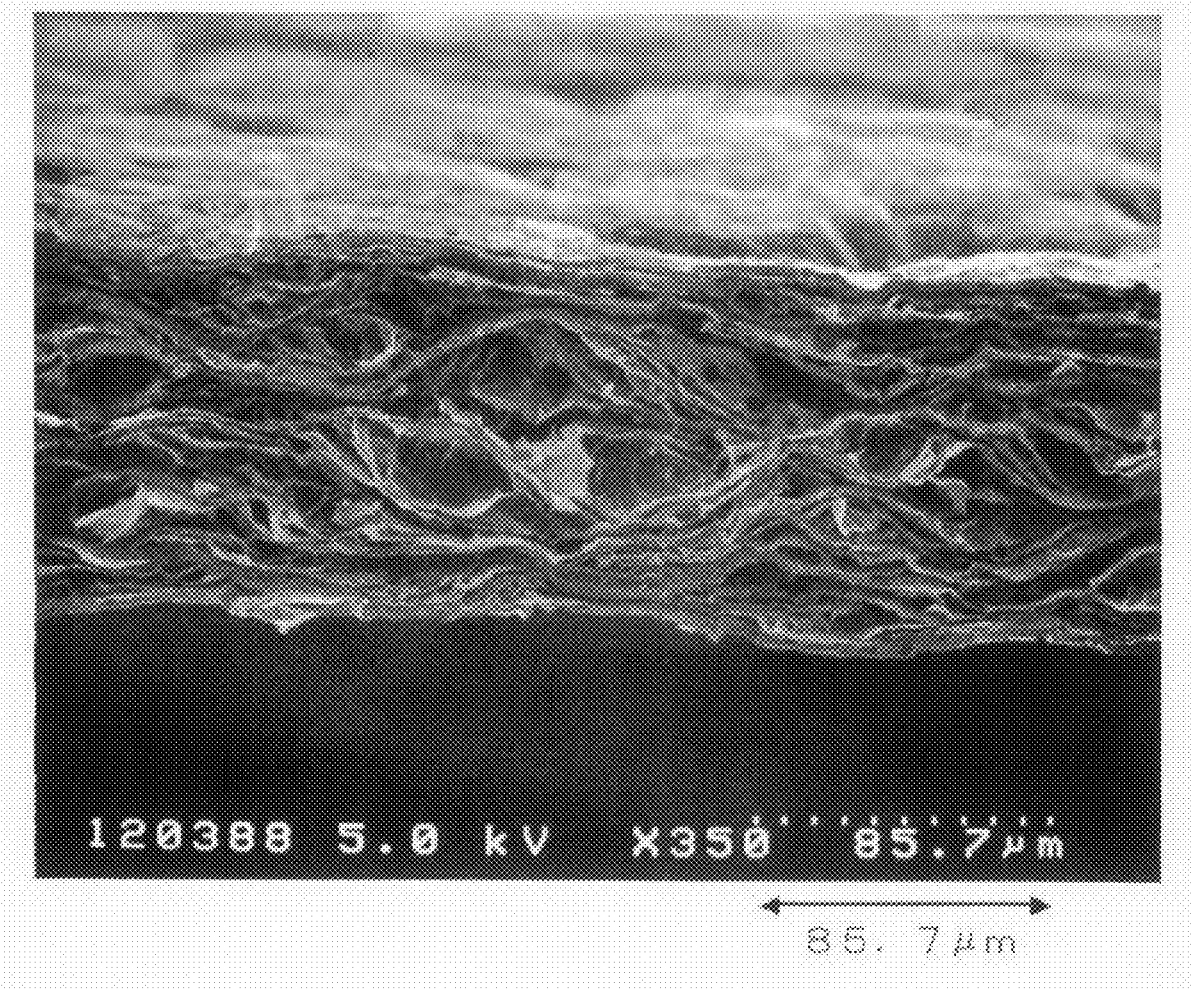
FIG. 5 is a cross-sectional SEM photograph of a polyimide film A having a thickness of 75 μm after graphitization.

FIG. 5 is a cross-sectional SEM photograph of a graphite film obtained by thermally treating a carbonized film from the polyimide film A having a thickness of 75 μm. When a polyimide film having a thickness of 75 μm is used, the graphite film is not cracked as in the case of using a polyimide film having a thickness of 225 μm. However, voids are formed in the film, and layers are separated in the film as a whole. A graphite film manufactured by Matsushita Electric Industrial Co., Ltd. in a cross-sectional photograph has a structure similar to that of FIG. 5.

It is assumed that a non-uniform layer or non-uniform phase was formed in the film in Examples, because a substance containing a metal was penetrated and dispersed in a broken part of the surface layer and the inside due to vaporization of decomposition gas or an excess graphene component during thermal treatment, and the substance was partially reacted with the film. It is also assumed that a non-uniform layer or non-uniform phase was formed even in the film, because thermal treatment was carried out at a high temperature, so that a substance containing a metal was penetrated and dispersed in the film and the substance was reacted with the film. It is further presumed that a substance containing a metal was reacted with a filler contained in the raw material film and the substance was penetrated and dispersed in a part where the filler was made absent, thereby forming a non-uniform layer or non-uniform phase. It is assumed that such a non-uniform layer was formed, so that decomposition gas generated in the graphitization process escaped from the non-uniform layer or non-uniform phase to prevent the film from being broken during thermal treatment. In a conventional graphitization process, a graphene layer is developed along the plane and the graphene layer is delaminated. However, when a non-uniform layer or non-uniform phase is formed in the film, separation can be partially fixed and separation can be prevented. Further, it is assumed that when non-uniform layer or non-uniform phase is formed, strain accumulated during thermal treatment can be relaxed.

The invention claimed is:

1. A process for producing a graphite film comprising the steps of:
    carbonizing a polymer film at a temperature of 800 to 1,500° C. to obtain a carbonized polymer film, wherein the polymer film is carbonized in a graphite container and/or between graphite plates;
    applying to a surface of the carbonized polymer film a substance containing a metal selected from the group consisting of a solid metal, liquid metal and gaseous metal; and
    thermally treating the carbonized polymer film at a final temperature of 2,400° C. or higher to obtain the graphite film, wherein
    the polymer film comprises one or more polymers selected from the group consisting of polyimide, polyamide, polyoxadiazole, polybenzoxazole, polybenzobisoxazole, polythiazole, polybenzothiazole, polybenzobisthiazole, poly(p-phenylene vinylene), polybenzimidazole and polybenzobisimidazole, and
    the metal is one or more selected from the group consisting of titanium, vanadium, chromium, manganese, iron, cobalt, nickel, copper, zinc, zirconium, niobium, molybdenum, technetium, ruthenium, rhodium, palladium, silver, cadmium, hafnium, tantalum, tungsten, rhenium, osmium, iridium, platinum, gold and mercury.

2. The process for producing a graphite film according to claim 1, wherein the container can be closed.

3. The process for producing a graphite film according to claim 1, wherein the metal is one or more selected from the group consisting of titanium, chromium, manganese, iron, cobalt, nickel, copper, palladium, platinum, and gold.

4. The process for producing a graphite film according to claim 1, wherein the metal is one or more selected from the group consisting of iron, cobalt, and nickel.

5. The process for producing a graphite film according to claim 1, wherein the polymer film comprises polyimide.

6. The process for producing a graphite film according to claim 5, wherein the polymer film is a polyimide film having a birefringence of 0.08 or more.

7. The process for producing a graphite film according to claim 5, wherein the polymer film is a polyimide film having a birefringence of 0.12 or more.

8. The process for producing a graphite film according to claim 5, wherein the polyimide film is prepared by imidizing a polyamide acid as a precursor using a dehydrating agent and an imidization promoter.

9. The process for producing a graphite film according to claim 5, wherein the polyimide film is prepared by imidizing a polyamide acid containing pyromellitic acid dianhydride and p-phenylenediamine using a dehydrating agent and an imidization promoter.

10. The process for producing a graphite film according to claim 5, wherein the polyimide film is prepared by synthesizing a prepolymer having an acid dianhydride at each terminal from a diamine and the acid dianhydride; synthesizing a polyamide acid by reaction of the prepolymer with a diamine differing from the diamine; and imidizing the polyamide acid.

11. The process for producing a graphite film according to claim 1, wherein the carbonized polymer film is thermally treated at a temperature of 2,700° C. or higher.

12. The process for producing a graphite film according to claim 11, wherein the carbonized polymer film is thermally treated at a temperature of 2,800° C. or higher.

13. The process for producing a graphite film according to claim 1, wherein the thermally treating step is conducted under a reduced pressure.

14. The process for producing a graphite film according to claim 1, wherein the substance containing a metal is one or more selected from the group consisting of iron chloride solution, iron sulfate solution, iron nitrate solution, cobalt chloride solution, and cobalt sulfate solution.

15. The process for producing a graphite film according to claim 5, wherein the substance containing a metal is one or more selected from the group consisting of iron chloride solution, iron sulfate solution, iron nitrate solution, cobalt chloride solution, and cobalt sulfate solution.

16. A process for producing a graphite film comprising the steps of:
   carbonizing a polymer film at a temperature of 800 to 1,500° C. so as to obtain a carbonized polymer film and prevent side reaction of carbonization;
   applying to a surface of the carbonized polymer film a substance containing a metal selected from the group consisting of a solid metal, liquid metal and gaseous metal; and
   thermally treating the carbonized polymer film at a final temperature of 2,400° C. or higher to obtain the graphite film, wherein
   the polymer film comprises one or more polymers selected from the group consisting of polyimide, polyamide, polyoxadiazole, polybenzoxazole, polybenzobisoxazole, polythiazole, polybenzothiazole, polybenzobisthiazole, poly(p-phenylene vinylene), polybenzimidazole and polybenzobisimidazole, and the metal is one or more selected from the group consisting of titanium, vanadium, chromium, manganese, iron, cobalt, nickel, copper, zinc, zirconium, niobium, molybdenum, technetium, ruthenium, rhodium, palladium, silver, cadmium, hafnium, tantalum, tungsten, rhenium, osmium, iridium, platinum, gold and mercury.

17. The process for producing a graphite film according to claim 16, wherein the polymer film is carbonized in a container and/or between plates so as to prevent the side reaction of carbonization.

18. The process for producing a graphite film according to claim 17, wherein the container is a graphite container.

19. The process for producing a graphite film according to claim 17, wherein the plates are graphite plates.

20. The process for producing a graphite film according to claim 18, wherein the container can be closed.

21. The process for producing a graphite film according to claim 16, wherein the metal is one or more selected from the group consisting of titanium, chromium, manganese, iron, cobalt, nickel, copper, palladium, platinum, and gold.

22. The process for producing a graphite film according to claim 16, wherein the metal is one or more selected from the group consisting of iron, cobalt, and nickel.

23. The process for producing a graphite film according to claim 16, wherein the polymer film comprises polyimide.

24. The process for producing a graphite film according to claim 23, wherein the polymer film is a polyimide film having a birefringence of 0.08 or more.

25. The process for producing a graphite film according to claim 23, wherein the polymer film is a polyimide film having a birefringence of 0.12 or more.

26. The process for producing a graphite film according to claim 23, wherein the polyimide film is prepared by imidizing a polyamide acid as a precursor using a dehydrating agent and an imidization promoter.

27. The process for producing a graphite film according to claim 23, wherein the polyimide film is prepared by imidizing a polyamide acid containing pyromellitic acid dianhydride and p-phenylenediamine using a dehydrating agent and an imidization promoter.

28. The process for producing a graphite film according to claim 23, wherein the polyimide film is prepared by synthesizing a prepolymer having an acid dianhydride at each terminal from a diamine and the acid dianhydride; synthesizing a polyamide acid by reaction of the prepolymer with a diamine differing from the diamine; and imidizing the polyamide acid.

29. The process for producing a graphite film according to claim 16, wherein the carbonized polymer film is thermally treated at a temperature of 2,700° C. or higher.

30. The process for producing a graphite film according to claim 29, wherein the carbonized polymer film is thermally treated at a temperature of 2,800° C. or higher.

31. The process for producing a graphite film according to claim 16, wherein the thermally treating step is conducted under a reduced pressure.

32. The process for producing a graphite film according to claim 16, wherein the substance containing a metal is one or more selected from the group consisting of iron chloride solution, iron sulfate solution, iron nitrate solution, cobalt chloride solution, and cobalt sulfate solution.

33. The process for producing a graphite film according to claim 23, wherein the substance containing a metal is one or more selected from the group consisting of iron chloride solution, iron sulfate solution, iron nitrate solution, cobalt chloride solution, and cobalt sulfate solution.

* * * * *